United States Patent [19]

Kleinert

[11] 4,304,960
[45] Dec. 8, 1981

[54] TELEPRINTER PRIVATE BRANCH EXCHANGE

[75] Inventor: Helmuth Kleinert, Munich, Fed. Rep. of Germany

[73] Assignee: Siemens Aktiengesellschaft, Berlin & Munich, Fed. Rep. of Germany

[21] Appl. No.: 84,626

[22] Filed: Oct. 12, 1979

[30] Foreign Application Priority Data

Oct. 23, 1978 [DE] Fed. Rep. of Germany ....... 2846130

[51] Int. Cl.³ .......................... H04J 3/06; H04Q 3/54; H04Q 11/00
[52] U.S. Cl. ..................... 178/3; 179/18 ES; 18 AD; 370/41; 370/86
[58] Field of Search ..................... 179/18 ES, 18 AD; 370/86, 41; 178/2 R, 3, 17.5, 4

[56] References Cited

U.S. PATENT DOCUMENTS 4,064,486 12/1977 Faber .................................. 370/86

4,144,407 3/1979 Zaffignani et al. ............. 179/18 ES

*Primary Examiner*—T. A. Robinson
*Attorney, Agent, or Firm*—Hill, Van Santen, Steadman, Chiara & Simpson

[57] ABSTRACT

In a teleprinter private branch exchange having a communications unit, to which teleprinter terminals are connected, a central unit and a storage unit, the load due to connections between the individual units on a bus connecting the individual units together is kept as low as possible. For this purpose, the individual units are connected to the bus through the processing systems such that the processing unit of the central unit controls the connection of the processing units of the other two units using the bus for just one signal transmission. It is also provided that the processing unit of the central unit also triggers the execution of the procedures to be executed in the communications unit and supplies the addresses of those storage areas in the storage unit in which associated signals are to be stored or are stored.

1 Claim, 1 Drawing Figure

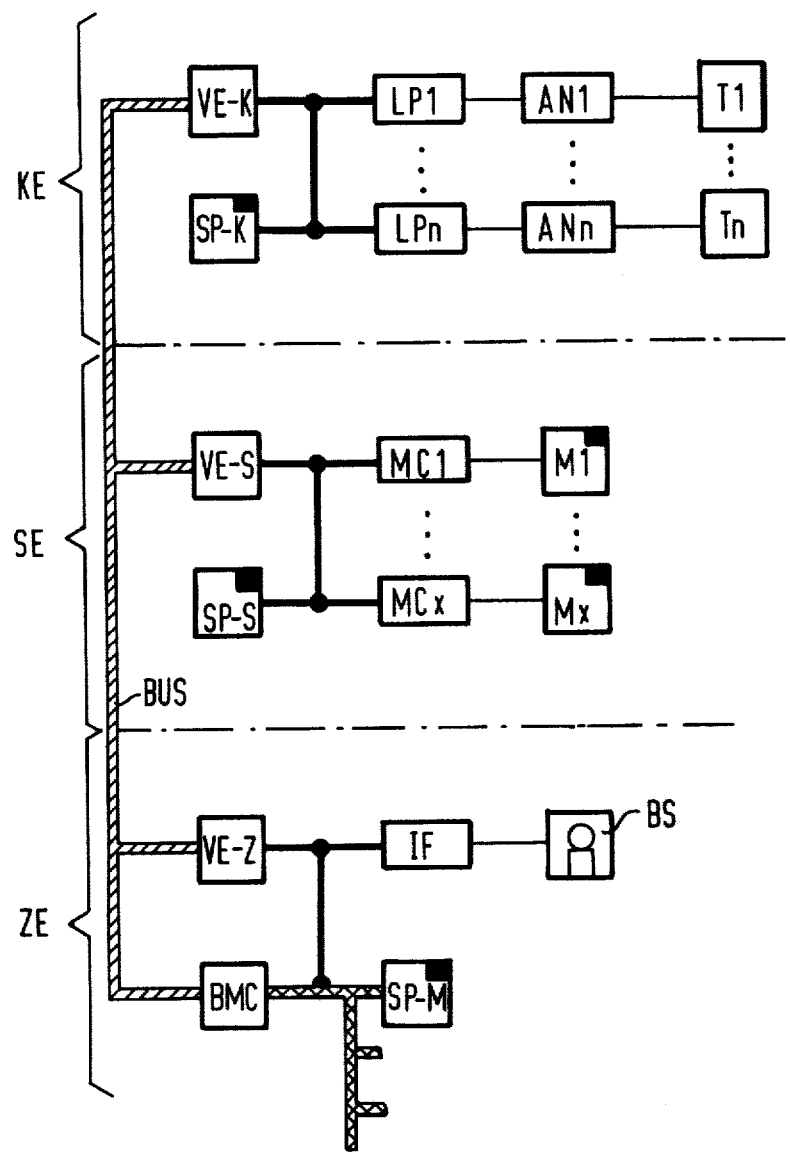

TELEPRINTER PRIVATE BRANCH EXCHANGE

BACKGROUND OF THE INVENTION

1. Field of the Invention

The present invention relates to a teleprinter private branch exchange having teleprinter terminals belonging to a communications unit, with a central unit which controls the traffic between the individual teleprinter terminals and, when appropriate, with one or more teleprinter or data lines of a separate teleprinter or data network, and with a storage unit in which signals emitted by or to be fed to a teleprinter terminal can be temporarily stored.

2. Description of the Prior Art

With a modular system of the type generally set forth above, which, in practice, consists of three independent units, namely a communications unit, a central unit and a storage unit, numerous control operations usually have to be handled on a bus linking these units together. This means that the bus is frequently not available to the central unit to carry out control functions. One could certainly provide separate control lines from the central unit to the portions of the other units to be controlled. However, this involves considerable circuitry expense.

SUMMARY OF THE INVENTION

Consequently, the underlying object of the present invention is to provide a teleprinter private branch exchange of the type generally mentioned above so that, one can manage, with the least possible expense on control, to transmit information between the individual units of the teleprinter private branch exchange without thereby having to accept any reduction in capacity compared with that of a teleprinter private branch exchange in which separate connecting lines are available for transmission of signals between the individual units.

The above object is achieved with a teleprinter private branch exchange of the type initially mentioned in that, according to the present invention, the communications unit, the central unit and the storage unit are each connected by means of a separate processing unit to a common bus such that the processing units of the communications unit and the storage unit, controlled by the processing unit of the central unit, can only be connected up for one signal transmission at a time and that, in addition to controlling the connection of the processing units of the communications unit and the storage unit, the processing unit of the central unit also triggers the execution of procedures to be executed in the communications unit and supplies the addresses of those storage areas of the storage unit in which associated signals have to be stored or are stored.

The present invention provides the advantage that the bus linking the communications unit, the central unit and the storage unit together is only used for a signal transmission when suitably actuated by the central unit so that the times at which and the extent to which the bus is made available for the individual transmission tasks can be fixed, therefore, from the central unit. Apart from this, the invention also provides the advantage that location and correction of signals stored in the storage unit can be done relatively easily. This is due to the fact that the information needed for location and correction—the addresses of the storage areas used in the storage unit—is made available by the particular unit, namely the central unit, which is directly addressed from the communications unit in the course of execution of such operations. Here, addresses are taken quite generally to mean data on storage areas in which signals are to be stored in the storage unit.

Advantageously, the processing system of the communications unit cyclically monitors the teleprinter terminals and teleprinter or data lines connected thereto for the appearance of call signals, and when such a call signal is received, a request signal can be transmitted to the central unit. Through this, the communications unit takes a considerable load off the central unit in that the central unit only becomes involved in the execution of the procedures then entailed once call signals have been picked up. In addition, this opens up the possibility of carrying out preprocessing of signaling in the communications unit or its processing system including conversion of formats and temporary storage signals where appropriate. This means that it is possible, relatively easily, to collect a predeterminable number of the signals emitted by the teleprinter terminals or fed in along teleprinter or data lines in the processing system of the communications unit for subsequent forwarding. This results, advantageously, in a further reduction in the load on the mentioned bus.

Advantageously, the addresses of the storage areas in the storage unit in which associated signals are stored can be emitted from the central unit to the storage unit for secure storage. This produces the advantage that secure forwarding of the signals stored in the storage unit is guaranteed, even after the system has been working for a lengthy time during which the central unit is involved in the performance of other control tasks. The mentioned storage of the addresses in the storage unit is carried out, in particular, when the signals stored in the correspondingly designated storage areas in the storage unit do not have to be passed on at once, but have to wait until their forwarding is expedient or even possible, for example, for reasons associated with changes.

One particularly simple design, as far as circuitry is concerned, is obtained when all the processing units are constructed in the same manner. Expediently, the processing units in question can be constituted by a microprocessor.

With regard to the possibility of expanding the teleprinter private branch exchange, it is advantageous if the central unit incorporates a control system which releases separate program memories in the central unit, depending on the system of the communications unit and the storage unit just about to be used at any time and depending on the instructions to be carried out at any time. With this expansion capacity for the program storage portion of the central unit, it is then relatively simple to increase the number of teleprinter terminals and teleprinter lines connected to the communications unit as well, without difficulties arising in the execution of the individual procedures required.

BRIEF DESCRIPTION OF THE DRAWING

Other objects, features and advantages of the invention, its organization, construction and operation will be best understood from the following detailed description, taken in conjunction with the accompanying drawing, on which there is a single figure which is a block diagram illustration of a system constructed in accordance with the present invention.

DESCRIPTION OF THE PREFERRED EMBODIMENTS

The teleprinter private branch exchange illustrated on the drawing comprises three units, namely a communications unit KE, a storage unit SE and a central unit ZE. These three units are connected together by means of a bus BUS comprising a plurality of lines. The units concerned each basically operate as independent units and out of synchronization with the other units. As will become clear further on, the central unit ZE is connected to the other two units at certain times, however, in order to receive control information from the other two units or to send control information thereto, and in order to trigger a signal transmission between these other two units.

The communications unit KE is connected through a separate processing unit VE-K to the bus BUS. This processing unit VE-K has a memory SP-K in which the program data required to operate the communications unit is or can be stored. The processing unit VE-K of the communications unit KE is connected through a plurality of line buffers LP1-LPn to a plurality of termination circuits AN1-ANn to which teleprinter terminals or teleprinter lines or data lines T1-Tn are connected. The teleprinter terminals, teleprinter lines and data lines can be connected to the termination circuits AN1-ANn with complete freedom; apart from this, the teleprinter terminals, teleprinter lines and data lines should be regarded as equally privileged systems in the communications unit KE.

The storage unit SE comprises a processing system or unit VE-S with which it is connected to the bus BUS. This processing system VE-S also has a memory SP-S in which the program data required in the storage unit SE for the execution of storage operations is or can be stored. Read/write memories M1-Mx are connected to the processing system VE-S of the storage unit SE through associated memory control circuits MC1-MCx.

The central unit ZE comprises a processing system or unit VE-Z with which it is connected to the bus BUS. The processing system VE-Z of the central unit ZE has a control system BMC which may also be connected to the bus BUS and which releases separate program memories in the central control unit ZE for the processing unit VE-Z, depending on the system construction of the communications unit KE and the storage unit SE which are just about to be used at any time and depending on the instructions to be carried out. The drawing only illustrates one of the program memories SP-M out of the plurality of program memories which may be connected to the control system BMC. In the present case, the processing unit VE-Z of the central unit ZE also has a page teleprinter BS connected thereto through an interface circuit IF. This page teleprinter BS may serve to log status or test signals.

Since the composition of the teleprinter private branch exchange illustrated on the drawing has been explained above, the way in which this exchange operates will now be examined. As already mentioned above, the three units of the teleprinter private branch exchange illustrated operate asynchronously. The individual termination circuits AN1-ANn or line buffers LP1-LPn are monitored by the processing unit VE-K of the communications unit KE for the presence of call signals, this being done expediently by cyclical interrogation of these elements. After detecting such a call signal and, where appropriate, after picking up of a predeterminable number of following signals, the processing unit VE-K of the communications unit KE can transmit to the central unit ZE a corresponding activation signal upon whose appearance the processing unit VE-Z of the central unit ZE calls up the procedure to be executed for onward transmission of the signals collected or received in the communications unit KE. This procedure can result in the signals concerned being passed on practically directly to the desired teleprinter terminal or teleprinter line or data line. However, if this desired teleprinter terminal or teleprinter line or data line is busy, or not ready to receive, the procedure can result in the signals previously picked up and collected being fed to the storage unit SE. In this case, the processing unit VE-Z of the central unit ZE provides the storage unit SE with an instruction to take over the signals concerned from the communications unit KE via the bus BUS. In addition, the storage unit SE, or its processing unit VE-S, is instructed by the central unit ZE as to the storage area or storage areas of the memories M1-Mx of the storage unit SE in which the signals concerned are to be stored. When these instructions have been provided to the storage unit SE, the operation of transferring the signals from the communications unit KE to the storage unit SE then takes place without involving the central unit ZE. Because of this, during this time the central unit ZE is available to carry out other routines.

Now the central unit ZE not only triggers the transmission of signals between the communications unit KE and the storage unit SE, it also controls the necessary connection build-up and clear-down in the communications unit KE. To control the connection build-up, the central unit ZE can use a call signal picked up by the communications unit KE and recognized as such. To control clear-down of a connection, the central unit ZE can use a clearing signal which has been received in the communications unit KE at the end of a message sent from a teleprinter terminal and evaluated as a clearing signal.

As already explained above, the addresses of those storage areas in the storage unit SE in which associated signals or signal blocks are to be or are already stored are made available through the processing unit VE-Z of the central unit ZE. These addresses do not need to remain constantly stored in a memory belonging to the central unit ZE. Instead, the addresses can also be fed to the storage unit SE for secure storage therein in a memory. Use is made of such an option particularly when the associated signals or message signals are supposed to remain stored in the storage unit SE for transmission to the desired teleprinter terminal at a later time. As a result, the central unit ZE is then relieved of the task of storing corresponding addresses. If necessary, the central unit ZE can take these addresses back again from the storage unit SE at the later time in order to feed the storage unit SE successively with these addresses together with corresponding instructions for transmission of the signals stored under the relevant addresses to the communications unit KE.

It should be clear from the above that the teleprinter private branch exchange illustrated on the drawing can be operated in either one of two different ways. In one manner of operation, signals which are emitted by teleprinter terminals connected to the communications unit KE or transmitted via teleprinter lines or data lines connected thereto, are sent directly to the other teleprinter terminal or teleprinter line or data line in question. In the other manner of operation, the signals fed to the communications unit KE are temporarily stored in the storage unit SE for subsequent retransmission to the communications unit KE for forwarding to the desired teleprinter terminal or teleprinter line or data line. Those signals for the execution of processing and control operations in the processing systems or units of the communications unit and the storage unit can be supplied by the central unit by executing a bootstrap program.

As an example of a working embodiment of the invention, it should be pointed out that the processing units VE-K, VE-S and VE-Z can be constituted by microcomputer systems of the type 8085 manufactured by Intel. The BMC can be realized by a PROM of the type 2708 manufactured by Intel being provided for controlling the mapping operation. The read/write memories Ml-Mx can be constructed by RAM's of the type 4200-A manufactured by SEMI and/or floppy discs. The memories SP-K, SP-S and SP-M can be constituted by RAM's of the above mentioned type. The line buffers LP1-LPn and the interface circuit IF can be constituted by modules of the type 8251A manufactured by Intel. The terminal circuits AN1-ANn can be realized by discrete and/or integrated transistor logic circuits, e.g. drivers. The memory control circuits MC1-MCx can be constituted by a programmable Floppy Disc Controller of the type 8271 manufactured by Intel if the respective memories Ml-Mx is realized by floppy discs. If at least one of the memories Ml-Mx is realized by RAM's then the respective memory control circuit is realized by conventional read/write logic circuits. Finally, the teleprinter BS can be a conventional teleprinter machine.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A teleprinter private branch exchange in which a central unit controls the traffic between the individual teleprinter terminals and, where appropriate, with at least one data line, comprising:
   a communications unit for connection to a plurality of communications terminals;
   a central unit for controlling traffic;
   a storage unit;
   a plurality of identically constructed processing units each in a respective communications unit, central unit and storage unit;
   a common bus connecting said processing units;
   said processing unit of said central unit operable to control said processing units of said storage and communications units for signal transmission one at a time;
   said processing unit of said central unit operable to trigger the execution of procedures to be executed in said central unit; and
   said processing unit of said central unit operable to supply addresses to said storage unit for storage areas thereof in which signals are stored or are to be stored, and wherein
   said processing unit of said communications unit includes means operable to monitor the communications terminals for the appearance of call signals and responsive to a call signal to transmit a request signal over said bus to said central unit,
   said central unit comprising means for transmitting over said bus to said storage unit addresses of signals stored in said storage unit for secure storage, and
   said central unit comprising a control system connected to said bus, a plurality of program memories connected to said control system, and said control system being operable to access said program memories in response to signals from said communications and storage units to access a desired program to be carried out.

* * * * *